(12) United States Patent
Mrosik et al.

(10) Patent No.: US 7,380,449 B2
(45) Date of Patent: Jun. 3, 2008

(54) METHOD AND DEVICE FOR TESTING A FUEL METERING SYSTEM

(75) Inventors: Matthias Mrosik, Higashimatsuyama (JP); Marco Gangi, Esslingen (DE); Udo Schulz, Vaihingen/Enz (DE); Michael Schueller, Friolzheim (DE); Eduard Moser, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/821,469

(22) Filed: Apr. 8, 2004

(65) Prior Publication Data

US 2004/0261509 A1  Dec. 30, 2004

(30) Foreign Application Priority Data

Apr. 11, 2003  (DE)  ............................... 103 16 634

(51) Int. Cl.
*G01M 15/00* (2006.01)

(52) U.S. Cl. ............ 73/119 A; 73/116; 73/117.2; 73/117.3; 73/118.1; 73/119 R

(58) Field of Classification Search ............... 73/118.1, 73/119 A, 119 R
See application file for complete search history.

(56) References Cited

U.S. PATENT DOCUMENTS

| 5,633,458 | A | * | 5/1997 | Pauli et al. ............... 73/119 A |
| 5,811,671 | A | * | 9/1998 | Seekircher et al. ........ 73/119 A |
| 6,085,142 | A | * | 7/2000 | Di Leo et al. ............. 701/104 |
| 6,293,251 | B1 | * | 9/2001 | Hemmerlein et al. ....... 123/447 |
| 6,754,604 | B2 | * | 6/2004 | Weiland ..................... 702/114 |

* cited by examiner

*Primary Examiner*—Edward Lefkowitz
*Assistant Examiner*—Freddie Kirkland, III
(74) *Attorney, Agent, or Firm*—Kenyon & Kenyon LLP

(57) ABSTRACT

A method and device for testing a fuel metering system. A control unit checks the injector contacts during the initialization phase prior to starting up the fuel metering system. For the test, the injectors are activated by the control unit, and the current values and/or voltage values are evaluated to detect errors. The control unit controls the fuel metering process during operation.

8 Claims, 2 Drawing Sheets

METHOD AND DEVICE FOR TESTING A FUEL METERING SYSTEM

BACKGROUND INFORMATION

A cold test is usually carried out as part of engine assembly testing. Among other things, this is done to test the injector contacts.

SUMMARY OF THE INVENTION

According to the present invention, this test is carried out by a serial control unit, which is used during normal operation to control fuel metering. Carrying out the cold test using the serial control unit makes it possible to substantially lower costs. In addition, the time required for the test, in particular for testing the injector contacts, may be significantly reduced because no test equipment needs to be installed and/or removed.

The test is preferably carried out during control unit initialization, i.e., during the initialization phase prior to startup. The injection system is still pressureless during this phase, which prevents unwanted injection and the danger of uncontrolled combustion. This also eliminates the time needed for pressure to build up in the high-pressure accumulator.

It is particularly advantageous to carry out the test once prior to startup, in particular, prior to the first startup. This may substantially reduce the amount of time required.

The test is preferably carried out when a speed variable is less than a threshold value or a rail pressure variable is less than a threshold value. This procedure makes it possible to reliably prevent unwanted injections during the test.

Carrying out the test when a voltage variable is greater than a threshold value ensures that a piezoelectric actuator may be reliably charged and/or discharged. The voltage across a buffer capacitor of the piezoelectric output stage is preferably evaluated as the voltage variable.

Error detection preferably includes a check for a short-circuit, an interruption and/or a pole reversal of lines. All errors that may occur during assembly are thereby detectable.

According to a particularly advantageous embodiment, the control unit is connected to a diagnostic tester, which may be designed so that it initializes the test. Alternatively or in addition, the results of the test are output and/or displayed via the diagnostic tester.

DETAILED DESCRIPTION

Figure 1:
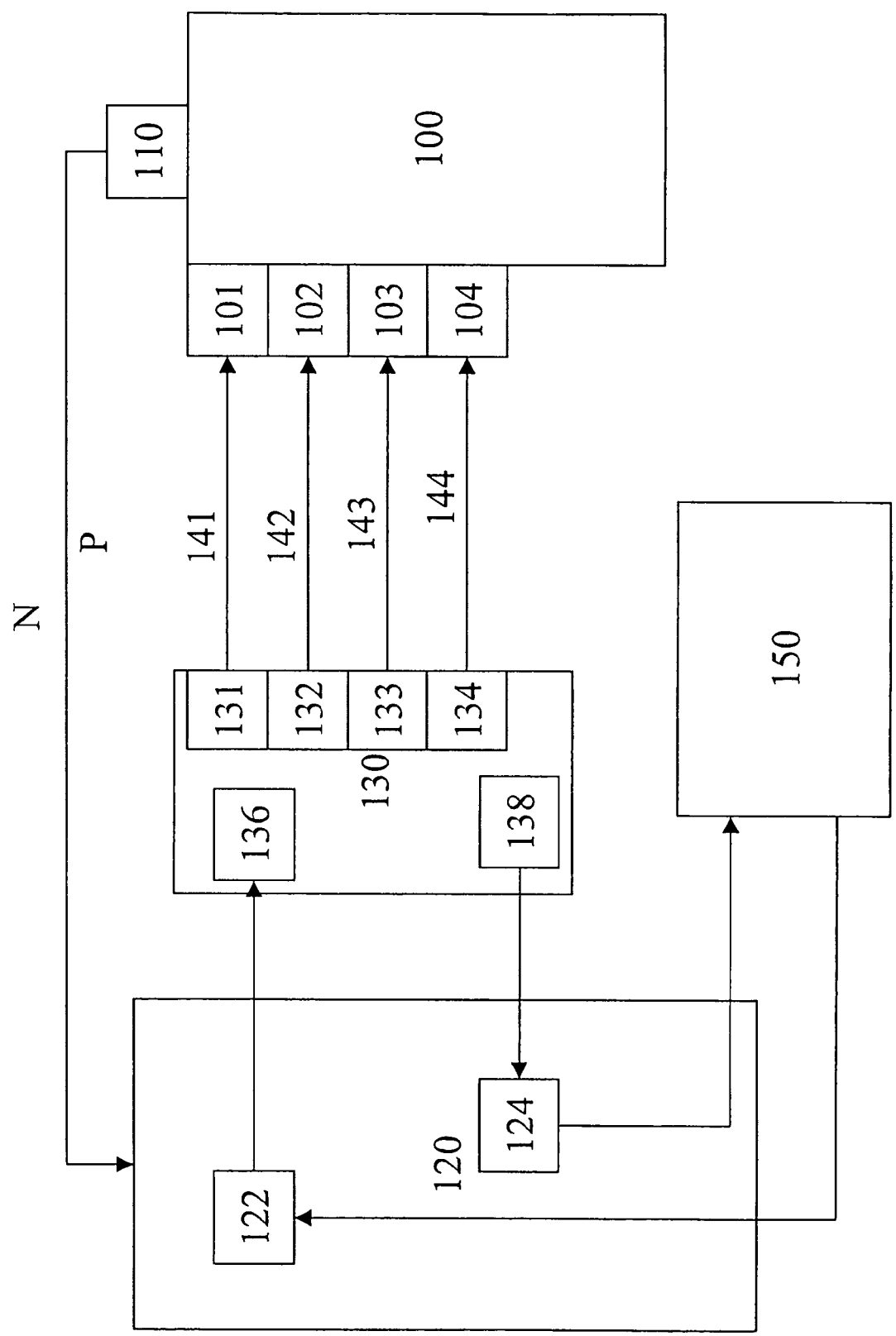
FIG. 1 shows a block diagram of the device according to the present invention.

FIG. 1 shows important elements of the device according to the present invention on the basis of a block diagram. An internal combustion engine is identified by reference number 100. Injectors 101 through 104 are assigned to this internal combustion engine. In addition, at least one sensor 110 is attached to internal combustion engine 100. The sensor applies a signal variable, among other things, to an engine controller 120. In particular, these are signals relating to the rotational speed of the internal combustion engine and/or rail pressure P.

Engine controller 120 includes, among other things, an injection controller 122 and an assembly tester 124. Injection controller 122 applies signals to a valve controller 130. Valve controller 130 includes, among other things, an output stage controller 136, an output stage diagnostic unit 138 and output stages 131 through 134 which are assigned to injectors 101 through 104. The output stages apply a supply voltage to the injectors via lines 141 through 144. Output stage diagnostic unit 138 applies a signal to assembly tester 124.

According to a particularly advantageous embodiment, a diagnostic tester 150 is provided which receives a signal from assembly tester 124 and which, in turn, applies a signal to injection controller 122. This is a device which is only connected to the engine controller from time to time.

Engine controller 120, valve controller 130, injectors 101 through 104, and additional elements which are not illustrated are preferably referred to as a fuel metering system. The engine controller and valve controller are preferably integrated into a control unit as a single structural unit. In addition to the functions described above, this control unit may also perform additional control functions in an internal combustion engine.

According to one embodiment, the engine controller and the valve controller may also be installed in separate control units. The injectors are preferably equipped with a piezoelectric actuator. By charging and discharging the piezoelectric actuators, the flow of fuel through the injectors, and thus the amount of fuel entering the combustion chambers of the internal combustion engine, is controllable.

Based on a number of sensor variables, such as speed N and other variables that are not illustrated, engine controller 120 determines a desired injection volume and a desired injection time. These variables are calculated by injection controller 122 and transferred to the valve controller. The output stage controller located there converts these signals to activating signals for output stages 131 through 134. This means that the output stage controller defines the beginning and end of the piezoelectric actuator charging and discharging processes.

To detect any errors that occur, an output stage diagnostic unit 138 is provided which evaluates different voltage values, current values and/or charging/discharging times within the valve controller and/or in the injector area.

A wide range of errors may occur while the controllers and injectors are being assembled or installed in the internal combustion engine. Among other things, a short circuit and/or interruption of one of connecting lines 141 through 144 may occur between the valve controller and one of the injectors. Short-circuits may connect grounded connecting lines to a supply voltage and/or a different connecting line. In addition, one of the injectors may be connected with reversed polarity. This means that the injector plus and minus terminals are switched.

To detect these and other errors, a cold test is carried out prior to the first startup of the internal combustion engine. To do so, the injectors are suitably activated, i.e., charged and discharged. Output stage diagnostic unit 138 evaluates measured variables before, during and after charging and/or discharging and detects one or more errors that may be present. If an error is detected, the valve controller transmits an error message to assembly tester 124.

It is particularly advantageous for the engine controller to carry out the cold test in conjunction with valve controller 130, i.e., via the control unit. The control unit including at least the engine controller and valve controller controls the usual fuel metering process during normal operation and also carries out the cold test prior to the first startup of the fuel metering system.

According to a particularly advantageous embodiment, the data relating to the fault-free and/or faulty state may be output by a diagnostic tester 150. In addition, the test may be triggered via diagnostic tester 150 by activating injection controller 122.

The use of the control unit, which controls fuel metering during operation, makes it possible to eliminate additional components.

The cold test is preferably carried out prior to the first startup of the overall system. This means that, after the overall system has been assembled, the cold test is initiated and the check carried out at the beginning of the first startup of the engine controller and/or valve controller.

According to one embodiment, the cold test is no longer carried out at the time of subsequent startups. According to a further embodiment, the cold test is carried out after each intervention into the overall system, for example, after each repair of individual components. Furthermore, according to a particularly advantageous embodiment, the check may be carried out each time the engine is started.

Figure 2:
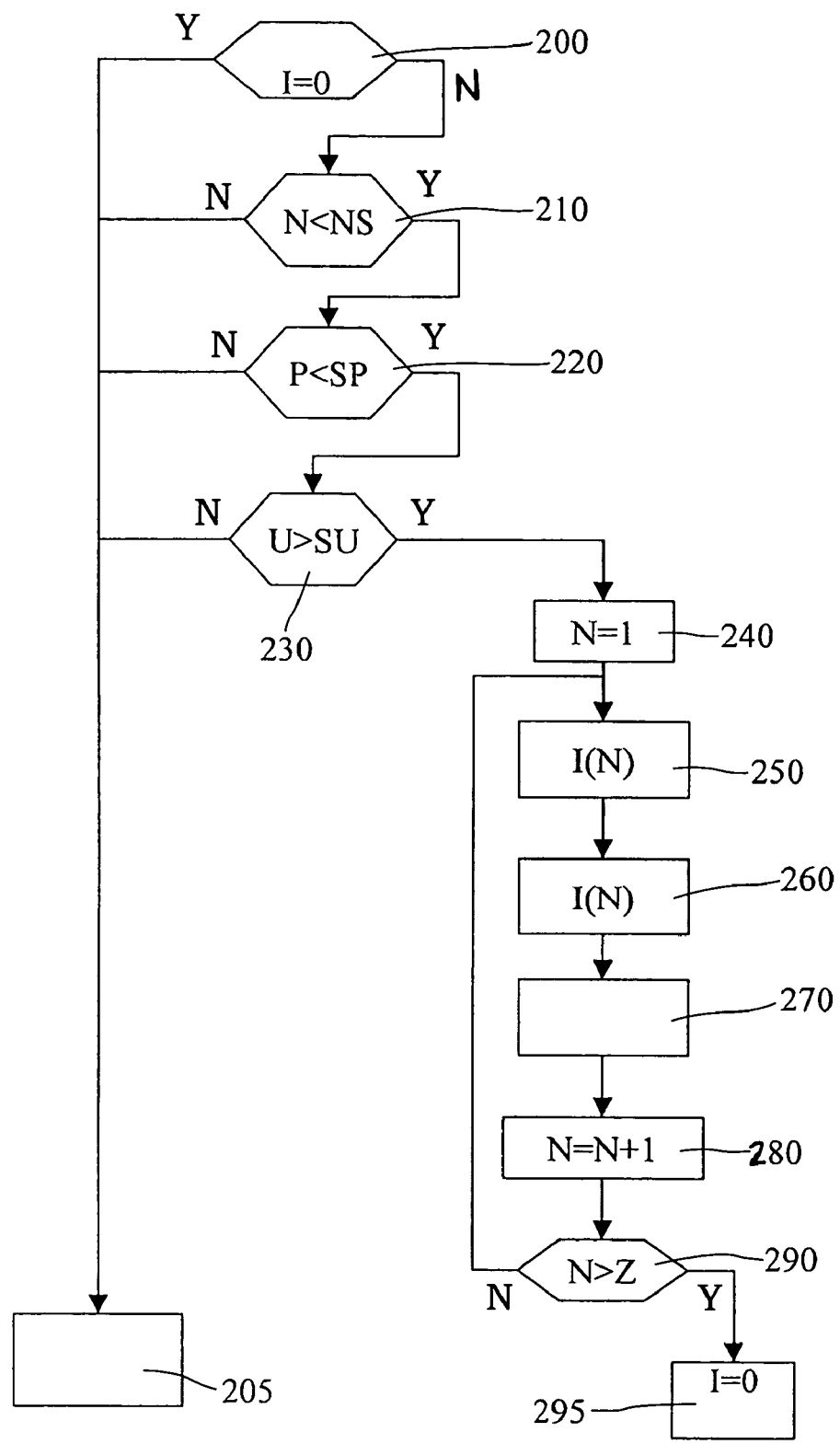
FIG. 2 shows a flowchart illustrating the procedure according to the present invention.

The procedure according to the present invention is illustrated by way of example below on the basis of the flowchart shown in FIG. 2. After initial activation of the internal combustion engine or the control unit, a query 200 checks whether a flag I has been set to 0. If so, step 205 follows. Starting with step 205, the usual control program is run. If the value of flag I is set to 1, query 210 follows.

According to one embodiment, the control unit is connected to diagnostic tester 150. In this case, the diagnostic tester may issue a request signal. According to this embodiment, query 200 checks whether a request signal is present. If so, query 210 also follows.

Query 210 checks whether speed variable N is less than a threshold value NS. If so, query 220 follows. This query checks whether rail pressure P is less than a threshold value SP. If this is also the case, a query 230 checks whether a voltage variable U is greater than a threshold value SU. If this is also the case, the actual cold test begins running in step 240.

The queries above ensure that the internal combustion engine is not yet placed into operation and, if this is the case, the test is suppressed. Flag I ensures that the test is run only once. Depending on the implementation, flag I is resettable to 1 after each deactivation. Alternatively, flag I is reset only when individual components are replaced, or the flag is set to 1 only at the time of manufacturing.

Alternatively, flag I is applicatively settable to a fixed value. This provides a special control unit for a cold test bay. The difference between this control unit and the serial control unit is the assignment of data to this one label.

Queries 210 and 220 ensure that the test is carried out only when the internal combustion engine is at a standstill and/or no pressure has built up in the fuel metering system. Query 230 ensures that the test is carried out only if sufficient power is available to charge and discharge the piezoelectric actuators.

Once all these tests have been successfully completed, a counter N is set to 1 in step 240. Injector I(1) is then charged in step 250. Injector I(1) is discharged in subsequent step 260. After the charging and full discharging operations have been performed, any errors that may occur are output from output stage diagnostic unit 138 in step 270 and written to assembly tester 124. Counter N is then incremented by one in step 280. Subsequent query 290 checks whether value N is greater than value Z; if so, the program run ends in step 295.

Steps 240, 280 and 290 ensure that the test of the individual injectors is carried out consecutively. Number Z corresponds to the number of cylinders. This means that the procedure is applicable to any number of cylinders.

Flag I is set to 0 in step 295. Steps 205 and 295 are then followed by the usual control unit initialization and subsequently by the usual fuel metering.

If the control unit is connected to the diagnostic tester, the values are transferred to diagnostic tester 150 in step 295. It is particularly advantageous for the results to be displayed by the diagnostic tester.

Because the internal combustion engine is not yet running during the test, important variables such as the rotational speed of the internal combustion engine have not yet been supplied to the engine controller. Injection controller 122 is therefore unable to set activation signals to be applied to the valve controller. According to the present invention, the variables needed to set the activation signals are generated, i.e., suitably set, by the engine controller and/or the valve controller.

For example, metering is controllable by an angle clock. To do so, a sensor is used to trigger pulses that characterize the position of the crankshaft and/or camshaft. Based on these pulses, the angle clock emits signals for forming the activation signals at predetermined angle settings of the crankshaft. According to the present invention, this angle clock is switched to a timer mode, i.e., the angle clock automatically generates crankshaft signals. These signals correspond to a constant engine speed.

During the test run, the activation start times and/or the activation duration are programmed into the angle clock. After the event has been processed, the diagnostic registers are output selectively from the output stage diagnostic unit by cylinder or injector and stored in the assembly tester. This function is repeated according to the number of cylinders.

It is particularly advantageous for the injectors to be activated by a reduced voltage and/or using a very short activation period, thereby preventing unwanted injection. This means that the entire duration of the activation period, i.e., the sum of the charging and discharging processes, should not exceed a certain time. This time is preferably 1 ms.

What is claimed is:

1. A method for testing a fuel metering system of an engine, comprising:
    checking injector contacts by a single, integrated control unit during an initialization phase prior to starting up the fuel metering system, wherein the integrated control unit is formed as a single, discrete structural unit separate from the engine;
    driving injectors by the single, integrated control unit for testing;
    evaluating by the single, integrated control unit at least one of (a) current values and (b) voltage values to detect errors; and
    controlling a fuel metering by the single, integrated control unit during operation, wherein only the single, integrated control unit performs the checking, driving, evaluating, and controlling steps, wherein no other control unit performs the steps of checking, driving, evaluating, and controlling.

2. The method according to claim 1, further comprising carrying out a test once prior to a first startup.

3. The method according to claim 1, further comprising carrying out a test when a speed variable is less than a threshold value.

4. The method according to claim 1, further comprising carrying out a test when a rail pressure variable is less than a threshold value.

5. The method according to claim 1, further comprising carrying out a test when a voltage variable is greater than a threshold value.

6. The method according to claim 1, wherein the detecting of errors includes a check for at least one of a short-circuit, an interruption and a polarity reversal of lines.

7. The method according to claim 1, further comprising, during a test, connecting the control unit to a diagnostic tester via which at least one of (a) the test is started and (b) results of the test are at least one of read-out and displayed.

8. A device for testing a fuel metering system consisting of:

a single, integrated control unit for testing injector contacts during an initialization phase prior to starting up the fuel metering system, for controlling injectors for a test, for evaluating at least one of (a) current values and (b) voltage values for error detection purposes, and for controlling a fuel metering during operation, wherein the integrated control unit is formed as a single, discrete structural unit separate from the engine.

* * * * *